United States Patent [19]

Scarpellino, Jr.

[11] 4,174,378

[45] Nov. 13, 1979

[54] IRIDIUM COMPOUND AND PREPARATION THEREOF

[75] Inventor: Anthony J. Scarpellino, Jr., Tuxedo, N.Y.

[73] Assignee: The International Nickel Company, Inc., New York, N.Y.

[21] Appl. No.: 924,618

[22] Filed: Jul. 14, 1978

[51] Int. Cl.$^2$ .................. C01B 21/00; C01G 55/00
[52] U.S. Cl. .................. 423/386; 423/387; 204/47
[58] Field of Search .................. 423/386, 387; 204/46, 204/47

[56] References Cited

U.S. PATENT DOCUMENTS

| | | |
|---|---|---|
| 1,077,920 | 11/1913 | Stevens . |
| 3,554,881 | 1/1971 | Piontelli et al. .................. 204/42 |
| 3,639,219 | 2/1972 | Skomoroski .................. 204/47 |

OTHER PUBLICATIONS

Chemical Abstracts, vol. 72, p. 17792u (1970).

Fischer et al., "Precious Metal Plating", Robt. Draper, Ltd., Teddington, 1964.
MacNamara, "The Electrodeposition of Iridium", J. Electrochemical Society, vol. 109(1), pp. 61–63 (1962).
Conn, "Iridium Plating", Plating Proceedings, pp. 1258–1251, (1965).
Mazza et al., "Plating with Precious Metals from Sulfanoate Containing Baths", Electrochim Metal, vol. 1, (4), pp. 405–408, 482 (1966).
Reddy, "Electrodeposition of Ruthenium", Trans. Inst. Med. Finishing, vol. 47, pp. 187–193 (1966).

*Primary Examiner*—Earl C. Thomas
*Attorney, Agent, or Firm*—Ewan C. MacQueen; Miriam W. Leff

[57] ABSTRACT

Iridium compounds are produced by refluxing a diammonium hexahalo salt of iridium and sulfamic acid in an aqueous medium for more than thirty hours. When the diammonium hexachloro salt of iridium is used, the iridium product is an olive green salt having a melting point above 350° C. The iridium products are useful as constituents of electroplating baths.

10 Claims, No Drawings

IRIDIUM COMPOUND AND PREPARATION THEREOF

This invention relates to novel iridium compounds and methods for their preparation.

Iridium has attractive chemical and physical properties. It is one of the most inert of all the platinum group metals. It is insoluble in aqua regia and mineral acids, highly conductive, has a high melting point, and is dense and hard. It can be used as a coating on less expensive and more readily available substrates for various decorative and/or functional purposes. Several baths are known for depositing iridium. Examples of such baths are shown in U.S. Pat. Nos. 1,077,920, 3,554,881, 3,639,219 and 72 CA 17792u. In general in preparing the baths iridium is used as a chloride or as the salt diamminohexachloro iridium IV. U.S. Pat. No. 3,639,219 discloses iridium chloride refluxed with sulfamic acid at about 100° C. from 15 to 60 hours, 30 hours being sufficient, and the resultant solution being used as the plating bath.

In accordance with the present invention a novel iridium compound which is especially useful as a component of a plating bath is formed by a method comprising:

Refluxing a diammonium hexahalo salt of iridium, e.g., $(NH_4)_2IrCl_6$ or $(NH_4)_2IrBr_6$, and sulfamic acid in water for a sufficient amount of time to permit the formation of a precipitate, which forms after distillation and cooling. For such precipitate to form, it is necessary to reflux the reactants for a sufficient length of time.

In the embodiment using $(NH_4)_2IrCl_6$, when refluxing has been carried out for more than 30 hours, e.g., at least about 50 hours or about 70 hours an olive green precipitate is formed after distillation and cooling. To be a useful constituent of an electroplating bath, the resultant iridium product must be washed thoroughly, e.g., until the precipitate is substantially uniformly olive green in color. The iridium product is soluble in water. Hence, to minimize dissolution, washing is carried out preferably below room temperature, e.g., at about 0° to 5° C. Such iridium product has a melting point above 350° C. Differential thermogravimetric analysis (DTG) in air shows the compound has a weight loss of about 46% from room temperature to 600° C. DTG analysis on $(NH_4)_2IrCl_6$ shows about a 61% weight loss under the same conditions.

The following example is given to illustrate the invention.

EXAMPLE 1

This example is given to illustrate a method of preparing an iridium compound of this invention.

A. Twenty-five grams of $(NH_4)_2IrCl_6$ and 60 grams of $NH_2SO_3H$ are dissolved in 600 ml of distilled water. The solution is refluxed continuously for 71 hours. Then 550 ml of the refluxed solution is distilled off in a distillation apparatus. The distillate is a clear, colorless solution which gives a positive test for $Cl^-$ ion when $AgNO_3$ is added to it. The remainder of the solution is dark murky green, which upon cooling yields a thick precipitate to settle. The precipitate is collected on filter paper and washed several times with ice water. After air drying, it is transferred to a desiccator to dry. Approximately 11 grams of an olive green salt is the result. The filtrate and rinse water will yield more of this green salt, but only after considerable standing or by reduction of the volume by another distillation. The iridium content of two different preparations were 44.4% and 45.1%. X-ray diffraction analysis of these salts gave a similar pattern, which was different from that of $(NH_4)_2IrCl_6$, the starting material. It appears from the IR spectrograph of the green salt that there is $H_2O$ present, but no IR-N-Ir bridge. Chemical analysis shows it to contain 44.4% Ir, 41.1% Cl, 5.3% N, 5.1% O, 4.12% $NH_4$, 0.71% $H_2O$, and the presence of H. No S is present. Its melting point is above 350° C.

B. The above procedure is repeated except that the solution of diammonium hexachloro iridium (IV) in sulfamic acid is refluxed for only 30 hours. X-ray diffraction analysis on a black precipitate obtained after distillation and filtration showed it to be the diammino iridium salt. In other words the diammonium iridium salt does not react in this time period.

C. The iridium salt produced can be added to a plating bath to deposit a ruthenium-iridium alloy, as disclosed in detail in co-pending U.S. application Ser. No. 924,632, filed July 14, 1978, and incorporated herein by reference.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A method of preparing an iridium compound comprising refluxing a diammonium hexahalo salt of iridium, said salt being a member of the group consisting of $(NH_4)_2IrCl_6$ and $(NH_4)_2IrBr_6$, and sulfamic acid in an aqueous medium for a period of time greater than about 30 hours, to permit the formation of a precipitate, said precipitate forming after distillation and cooling of the resultant refluxing product.

2. A method of claim 1, wherein the diammonium hexahalo iridium salt is a chloride and the precipitate is olive green.

3. A method of claim 1, wherein refluxing is carried out for at least about 50 hours.

4. A method of claim 3, wherein refluxing is carried out for about 70 hours.

5. A method of claim 2, wherein the green precipitate formed after cooling is separated from the solution.

6. A method of claim 5, wherein the separated green precipitate is washed with water at a temperature of about 0° to about 5° C.

7. As a composition of matter, the precipitated iridium product prepared by the method of claim 1.

8. As a composition of matter, the precipitated iridium product prepared by refluxing $(NH_4)_2IrCl_6$ and sulfamic acid in water for over 30 hours and formed on cooling and distillation.

9. A product of claim 8, wherein said precipitated iridium product has a melting point greater than 350° C.

10. A method of preparing an iridium compound comprising refluxing a diammonium hexahalo salt of iridium, said salt being a member of the group consisting of $(NH_4)_2IrCl_6$ and $(NH_4)_2IrBr_6$, and sulfamic acid in an aqueous medium for a period of time greater than 30 hours to permit the formation of a precipitate, said precipitate forming after distillation and cooling of the resultant refluxing product, distilling and cooling said refluxing product to form said precipitate.

* * * * *